(12) United States Patent
Schreiber

(10) Patent No.: US 8,881,615 B2
(45) Date of Patent: Nov. 11, 2014

(54) TRANSMISSION

(75) Inventor: Heiko Schreiber, Gnaschwitz (DE)

(73) Assignee: Wittenstein AG, Igersheim (DE)

(*) Notice: Subject to any disclaimer, the term of this patent is extended or adjusted under 35 U.S.C. 154(b) by 182 days.

(21) Appl. No.: 13/536,190

(22) Filed: Jun. 28, 2012

(65) Prior Publication Data

US 2013/0000431 A1    Jan. 3, 2013

(30) Foreign Application Priority Data

Jul. 1, 2011    (DE) .......................... 10 2011 051 514

(51) Int. Cl.
| | | |
|---|---|---|
| *F16H 1/24* | (2006.01) | |
| *F16H 55/02* | (2006.01) | |
| *F16H 33/00* | (2006.01) | |
| *F16H 35/00* | (2006.01) | |
| *F16H 37/00* | (2006.01) | |
| *F16H 25/12* | (2006.01) | |
| *F16H 19/04* | (2006.01) | |
| *F16H 49/00* | (2006.01) | |

(52) U.S. Cl.
CPC ................ *F16H 25/12* (2013.01); *F16H 19/04* (2013.01); *F16H 2049/008* (2013.01)
USPC .......................................... 74/424.94; 74/640

(58) Field of Classification Search
CPC ......... F16H 25/20; F16H 25/24; F16H 25/12; F16H 49/001; F16H 35/00; F16H 2049/008; F16H 25/16; F16H 25/186; F16H 55/17; F16H 1/06; F16H 2049/003; F16H 25/06; F16H 55/0833; F16H 25/229; F16H 2049/006; F16H 37/12

USPC ................. 74/89.23, 424.71, 424.78, 424.94, 74/424.95, 415, 457, 640, 112, 122, 124, 74/125, 127, 422, 89.17

See application file for complete search history.

(56) References Cited

U.S. PATENT DOCUMENTS

| | | | | |
|---|---|---|---|---|
| 2,556,572 | A * | 6/1951 | Brinkhurst | 74/89.27 |
| 2,928,289 | A * | 3/1960 | Maroth | 74/89.27 |
| 3,468,175 | A * | 9/1969 | Rabek | 74/63 |
| 3,507,159 | A * | 4/1970 | Batty | 74/63 |
| 4,798,104 | A * | 1/1989 | Chen et al. | 74/63 |
| 2002/0088292 | A1* | 7/2002 | Berger et al. | 74/422 |
| 2008/0011113 | A1* | 1/2008 | Safran et al. | 74/89.17 |
| 2008/0210039 | A1* | 9/2008 | Brun | 74/424.94 |

FOREIGN PATENT DOCUMENTS

| | | |
|---|---|---|
| DE | 195 16 199 A1 | 11/1996 |
| DE | 10 2007 016 189 A1 | 4/2007 |
| DE | 10 2006 042 786 B4 | 3/2008 |
| EP | 0 122 596 B1 | 10/1984 |
| EP | 12174151.6 | 10/2012 |
| GB | 153982 A | 11/1920 |

* cited by examiner

*Primary Examiner* — Justin Krause

(74) *Attorney, Agent, or Firm* — Moser Taboada

(57) ABSTRACT

Transmission, in particular for converting a rotational movement around the longitudinal axis of the transmission into a linear movement in the direction of the longitudinal axis or vice versa, having a rod having a gearing, a gear tooth carrier, in which gear teeth are accommodated so they are radially movable for an engagement with the gearing, the rod and the gear tooth carrier being mounted rotationally fixed relative to one another.

9 Claims, 4 Drawing Sheets

TRANSMISSION

RELATED APPLICATIONS

This application claims priority to German Patent Application Serial Number 102011051514.3 filed Jul. 1, 2011, which is herein incorporated by reference.

FIELD OF THE INVENTION

The invention relates to a transmission, in particular for converting a rotational movement around a longitudinal axis of the transmission into a linear movement in the direction of the longitudinal axis and the use of such a transmission.

BACKGROUND

Various transmissions are known from the prior art, using which rotational movement can be converted into linear movements. Such transmissions are of interest for applications in which the rotational movement of a drive, such as an electric or hydraulic motor, is to be converted into a linear movement. Various structural forms exist in order to generate the largest possible forces in the linear direction.

A transmission for converting a rotational movement into a linear movement, which is known from the prior art, is the roll spindle transmission. One specific embodiment of such a roll spindle transmission is disclosed in DE 195 16 199 A1. In roll spindle transmissions, rolls which are disposed around a spindle disposed in the middle are set in a rotational movement relative to the spindle. This can be performed by rotating the rolls around the central axis of the transmission or by rotating the spindle. The rolls are additionally supported on a nut. If the spindle is driven in roll spindle transmissions, the spindle performs a longitudinal movement relative to the nut.

In regard to the transmission of large forces in the longitudinal direction, as is generally aimed for in roll spindle transmissions, the mounting of the rotating part transmitting a linear force, for example, the mounting of the spindle, is problematic. The reason is that the bearings for the rotational movement must also absorb the linear force. This makes the mounting complex and limits the forces transmittable in the linear direction.

Rolling ring spindle transmissions are also known from the prior art, for example, from EP 0 122 596 B1. EP 0 122 596 B1 shows a possibility of how a linear transmission can be provided using a drive spindle and a rolling ring engaging in the thread grooves of the drive spindle. However, this transmission also has the fundamental property that a linear force must be tapped from a rotating component, for example, from the rotating spindle. Furthermore, the rolling rings must also be mounted so they are rotatable, so that a support of linear forces via a pivot bearing is necessary. This in turn limits the transmittable forces and makes the mounting costly and complex.

DISCLOSURE OF THE INVENTION

The object of the invention is to specify an improved transmission for converting a rotational movement into a linear movement or vice versa, in particular a large transmittable force in the linear direction being achieved in a small structural space or, in particular, the absorbing of the advance force in the linear direction by pivot bearings becoming superfluous.

The object is achieved by a transmission according to Claim 1 and a use of such a transmission according to the concurrent claim.

According to the invention, a transmission is provided, which comprises a rod having a gearing and a gear tooth carrier, in which gear teeth are accommodated so they are radially movable for engagement with the gearing. The rod and the gear tooth carrier are mounted so they are rotationally fixed to one another. In addition, the rod and the gear tooth carrier are preferably mounted so they are relatively linear displaceable to one another. The transmission is capable in particular of converting a rotational movement around a longitudinal axis of the transmission into a linear movement in the direction of the longitudinal axis.

The transmission preferably comprises a drive device for the radial driving of the gear teeth. In this case, the term "drive device" also comprises the fact that the transmission is driven in the reverse direction, the drive device being driven by the radially movable gear teeth. In this case, the "drive device" is used for a rotation output. In typical embodiments, the drive device at least or exclusively drives the gear teeth radially. The drive preferably occurs exclusively radially inward or exclusively radially outward. If the gear teeth are driven exclusively radially inward, the gear teeth are driven radially back outward by the gearing of the rod and the movement of the rod relative to the gear tooth carrier as soon as the drive device permits it. This occurs similarly in the case of an exclusively outward radial drive.

The drive device preferably comprises at least one cam disc, which typically has one, two, three, or four or more projections or cams. The cam disc is typically mounted to rotate around the longitudinal axis of the transmission and therefore represents the output or drive element for the rotational movement. The drive device or the cam disc is rotationally movable relative to the gear tooth carrier or to the rod, while in contrast the rod and the gear tooth carrier are rotationally fixed relative to one another. Embodiments in which rod or gear tooth carrier are mounted with a blocked rotational degree of freedom offer special advantages, since the elements for transmitting the linear force have no pivot bearings.

The gear tooth carrier and the rod are typically disposed concentrically, which results in a compact construction. In embodiments of the invention, the gear tooth carrier is implemented in multiple parts, in particular subdivided into multiple oblong sections in the longitudinal axis. A circumferentially continuous gear tooth carrier offers the advantage of a high degree of stability. The gear teeth are disposed in the gear tooth carrier so they are preferably radially movable in relation to the longitudinal axis, for example, in that the gear teeth are plugged into corresponding openings of the gear tooth carrier. The gear tooth carrier preferably comprises at least partially radially aligned openings for accommodating the gear teeth. The openings are typically continuous in the radial direction. It is thus possible that the gear tooth head can protrude on one side of the gear tooth carrier and the lower gear tooth end can protrude on the other side for interaction with the drive device.

The cam disc is preferably disposed concentrically to the rod or to the gear tooth carrier, this again results in a particularly compact construction. The gear teeth in the gear tooth carrier are preferably disposed circumferentially on a circle. The circle is preferably in a plane perpendicular to the longitudinal axis. Further embodiments comprise gear teeth which are disposed with a pitch in the gear tooth carrier.

Typical embodiments comprise a plurality of gear tooth circles which are disposed in the gear tooth carrier. This increases the carrying capacity. The gear tooth circles are preferably disposed in parallel along the longitudinal direction. One gear tooth circle typically comprises at least 4, preferably at least 8 or 12 gear teeth disposed adjacent to one another in the circumferential direction. The gear teeth are typically disposed, uniformly distributed, around the circumference. An ideal force distribution is thus achieved and dead points are avoided. The plurality of gear tooth circles, which each comprise multiple gear teeth, are typically driven by one or more cam discs. A drive having a cam disc offers a simple construction, a drive having multiple cam discs allows for an offset of the engagement, for example, to increase a rigidity of the transmission. Advantageous embodiments comprise at least two cam discs. The maxima of multiple cam discs are preferably distributed at least substantially uniformly around the circumference of the gear tooth carrier. Adjacent cam discs are preferably disposed so that their maxima to one another are rotated by at least 30° in relation to one another. Smaller or larger relative rotations are also possible in embodiments, for example, in the range 5°-90°.

Typically, the drive device engages with the gear teeth and the gearing is designed in such a manner that during a rotation of the drive device or one or more cam discs functioning as the drive device, the rod is linearly displaced in relation to the gear teeth and the gear teeth carrier. This also applies to the reverse case, in which the operation of the transmission occurs in such a manner that a longitudinal displacement, i.e., a displacement of the rod relative to the gear tooth carrier in the longitudinal direction, is converted into a rotational movement of the drive device. The gear teeth are preferably fixed in the peripheral direction in relation to the rod or the gear tooth carrier, i.e., they do not rotate around the longitudinal axis of the transmission. In typical embodiments, the gear teeth are disposed in the gear tooth carrier in such a manner that they can rotate around their gear tooth longitudinal axis. A possible rotation of only a small amount is preferable, in particular at most 10°, preferably at most 5° or at most 3°, around the gear tooth longitudinal axis. The gear tooth longitudinal axis is preferably aligned radially to the longitudinal axis of the transmission or radially to the transmission. A restricted rotatable mounting in relation to the gear tooth longitudinal axis offers the advantage that the gear teeth can be aligned for the least possible friction of the flanks of the gearing and the gear teeth. Further embodiments comprise support elements, in each of which at least two gear teeth are accommodated. The two gear teeth are typically disposed one behind the other in the longitudinal direction of the transmission. A fixed mounting is thus achieved using simple means. The drive by the cam discs preferably occurs via the support elements.

In typical embodiments, there is a pitch between the gearing of the rod and the gear teeth disposed in the gear tooth carrier. Such a pitch can be implemented in embodiments in that the gearing of the rod is implemented having a pitch. In further embodiments, the gear teeth in the gear tooth carrier are disposed having a pitch in the circumferential direction. Therefore, the gear teeth in the gear tooth carrier "are raised" in relation to the longitudinal axis. Embodiments comprise a rod having a gearing without pitch or having no substantial pitch. This offers the advantage of a simple construction. The gear teeth in the gear tooth carrier are preferably disposed without a pitch. In embodiments, the gearing of the rod preferably has a pitch. The pitch preferably corresponds to the number of the protrusions of the cam disc of the drive device.

In embodiments in which the gearing of the rod has a pitch, the rod can be designed as a threaded rod. In embodiments having a rod in the form of a threaded rod, the gearing of the rod is typically implemented as faceted or the gear teeth have a negative or positive crowning. In a transmission having an encompassing external cam disc with an internal cam profile, the gear teeth are preferably implemented having a negative crowning. A negative crowning preferably means that the gear teeth are designed as at least partially concave on their gear tooth flanks.

The gear teeth are preferably disposed in the gear tooth carrier so that the gear tooth flanks or the gear tooth heads are aligned at least partially perpendicular to the longitudinal direction. In typical embodiments, the gear tooth flanks or gear tooth heads are aligned at an angle of at most 45°, preferably at most 20°, more preferably at most 10° or 5° in relation to the circumferential direction around the longitudinal axis. The gear teeth are preferably rotated in relation to the circumferential direction having their gear tooth heads or gear tooth flanks corresponding to the angle of the pitch of the gearing of the rod. Further typical embodiments have a gearing of the rod which comprises individual gear teeth, which are disposed with a stepped pitch in the circumferential direction of the rack. The individual gear teeth are in rows one behind another in the longitudinal direction of the rod. In operation, the radially movable gear teeth each travel along the rod along precisely one row of the individual gear teeth aligned in the longitudinal direction. Such a gearing offers the advantage that it can geometrically correspond to a toothed rack. In embodiments, one or more individual gear tooth rows are disposed on the rod. The individual gear tooth rows are preferably engaged with hollow-crowned gear teeth of the gear tooth carrier. The rod can also be implemented in multiple parts in embodiments. This particularly offers advantages if the gearing of the rod points inward. In this case, multiple external toothed racks can form the rod. In further embodiments, multiple internal toothed racks form the rod.

Typical embodiments comprise a hollow rod. This allows, for example, the feed through of a shaft for other applications. In embodiments, the gearing of the rod is designed as internal gearing. This allows an arrangement of the gear tooth carrier inside the rod, the drive device or cam disc being disposed inside the gear tooth carrier. In this way, a particularly simple drive of the internal drive device is made possible, for example, by attachment to a drive shaft. The gear teeth mounted in the gear tooth carrier are driven from the inside to the outside by the drive device in such embodiments.

In further embodiments, the rod is disposed inside the gear tooth carrier. The drive device is preferably disposed outside the gear tooth carrier, in particular concentrically around the gear tooth carrier. Preferred embodiments comprise at least one external cam disc with an internal cam profile. The external cam disc is preferably disposed in a ring shape around the gear tooth carrier. The gear teeth are preferably driven inward by the external cam disc. Roller bearings, needle roller bearings, or plain bearings are preferably disposed between the cam disc and the gear teeth, which permit rotation of the rotating cam disc in relation to the rotationally fixed mounted gear teeth, but allow a force transmission in the radial direction between the cam disc and the gear teeth. Furthermore, additional support elements for accommodating and supporting the gear teeth are preferably disposed between the gear teeth and the cam disc, in particular the mounting. Embodiments having an external drive device, in particular having an external cam disc with an internal cam profile, offer the advantage that the mounting has sufficient space between the drive device and the gear teeth to also be able to transmit large forces of the gear teeth in the radial direction.

A further aspect of the invention relates to a drive having a transmission in one of the above-described embodiments having a motor, which drives the drive device.

A further aspect relates to the use of a transmission in one of the described embodiments for converting a rotational movement into a linear movement or vice versa. In the case of typical uses of embodiments, the gear tooth carrier and the rod each form the linear output element or the counter bearing. The special advantage of the invention is that the force flow from the rod to the gear tooth carrier is short and pivot bearings are not required for a transmission of the axial force or linear force.

BRIEF DESCRIPTION OF THE DRAWINGS

Exemplary embodiments of the invention are explained in greater detail hereafter on the basis of the appended drawings, in the drawings.

DESCRIPTION OF EMBODIMENTS

Figure 1:
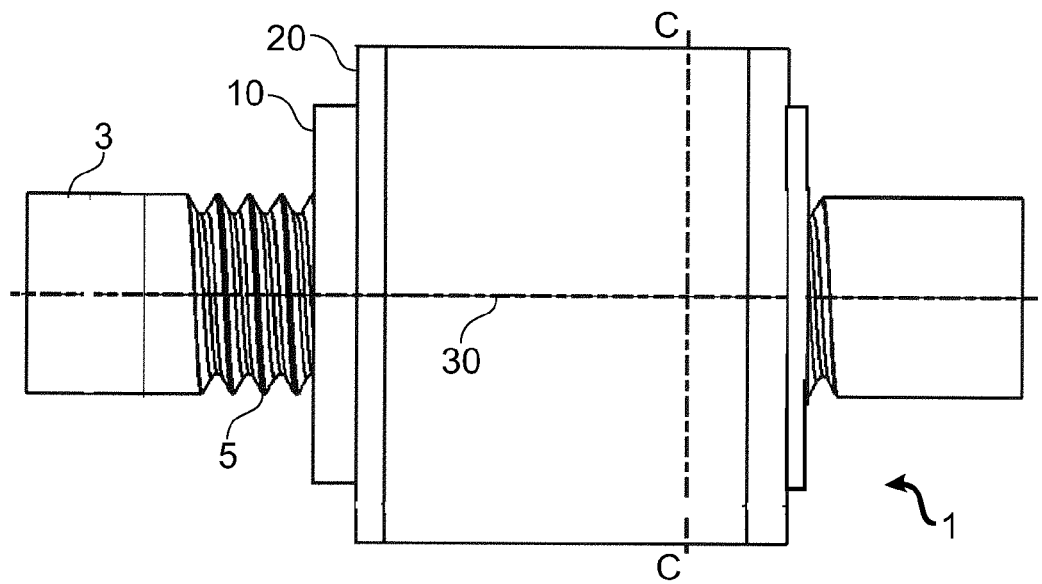
FIG. 1 shows an embodiment in a schematic side view.

FIG. 1 shows a schematic side view of a transmission 1 for converting a rotational movement into a linear movement or vice versa. The transmission 1 comprises an internal rod 3, which has a gearing 5 in a middle area. The gearing 5 of the rod 3 of FIG. 1 is identical to the gearing of a threaded rod, wherein, however, the gearing 5 of the rod 3 is not used as a thread. The rod 3 is blocked in its rotational degree of freedom, i.e., it is mounted so it is non-rotatable.

Furthermore, the exemplary embodiment of FIG. 1 comprises a gear tooth carrier 10, which is disposed concentrically to the rod 3. The gear tooth carrier 10 is in turn enclosed by a drive collar 20, which is also disposed concentrically to the rod 3. The drive collar 20 is mounted so it is rotatable, in contrast, the gear tooth carrier 10 is blocked in its rotational degree of freedom, i.e., it does not rotate in relation to the rod 3. Upon a rotation of the drive collar 20, the rod 3 is linearly displaced in relation to the gear tooth carrier 10 in the direction of a longitudinal axis 30 of the transmission 1. It is possible to mount the gear tooth carrier 10 fixed in place, to rotate the drive collar 20, and to tap a linear movement or an advance on the rod 3. The special advantage in relation to other comparable transmissions for a linear advance is that the gear tooth carrier 10 and the rod 3 do not have to be rotatably mounted, so that with compact dimensions of the transmission 1, a strong advance force and a high degree of stiffness of the transmission can be achieved.

Figure 2:
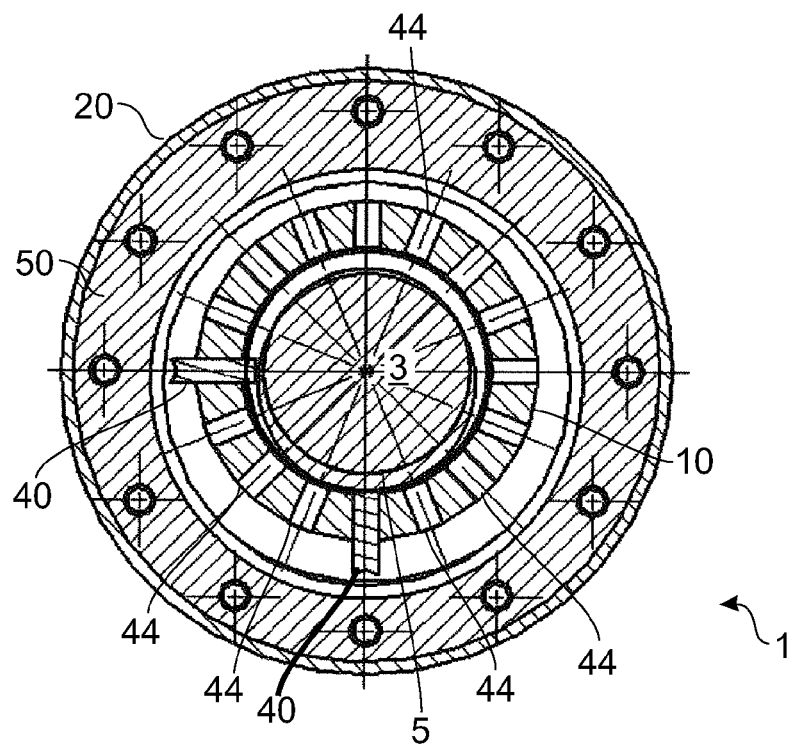
FIG. 2 shows a section through the embodiment of FIG. 1.

Section C-C of FIG. 1 is shown in FIG. 2. The schematic sectional view of FIG. 2 partially shows parts identical to those in FIG. 1. In general in the context of the description of exemplary embodiments, identical or similar parts are indicated by identical reference numerals and are not all explained in detail once again.

The rod 3 having the gearing 5 is disposed internally in the transmission 1. For better clarity of the illustration, only two gear teeth 40 are shown, which are accommodated in openings 44 of the gear tooth carrier 10. Normally, all 16 openings 44 of the gear tooth circle shown in the sectional depiction of the gear tooth carrier 10 are occupied with gear teeth 40. However, it is also possible in embodiments not to occupy all openings 44 with gear teeth 40, in particular if a plain mounting is used between a drive and the gear teeth 40. All openings 44 are preferably occupied with gear teeth 40, in order to allow or make easier a mounting using needle bearings, for example.

The gear teeth 40 are accommodated so they are radially displaceable in the openings 44 of the gear tooth carrier 10. The openings 44 of the gear tooth carrier 10 are continuous in the radial direction. The gear teeth 40 are driven radially inward by a cam disc 50. The cam disc 50 is designed as an external cam disc and has one inward protrusion over its circumference, so that during a revolution of the cam disc 50, each of the gear teeth 40 is driven radially inward precisely once.

The gearing 5 of the rod 3 also has a pitch of one, so that during a rotation of the cam disc 50, the gear teeth 40 along the circumference are continuously driven radially inward in accordance with the pitch of the gearing 5, so that the rod 3 is linearly moved. The gear teeth 40 are accommodated in the circular openings 44 so they are rotatable around their own gear tooth longitudinal axis, which corresponds to the radial direction in relation to the longitudinal axis 30 of the transmission 1. The gear tooth heads of the gear teeth 40 align themselves according to the pitch of the gearing 5 of the rod 1, so that the gear tooth heads are slightly rotated in relation to a peripheral direction of the rod 3 or the transmission 1, respectively, the rotation being less than 10°.

Not all gear teeth 40 are shown in FIG. 2 and, in addition, the mounting of the gear teeth 40 on the cam disc 50 is not shown. However, it is recognizable in FIG. 2 that the gear teeth 40 are driven radially inward by the concentric inner curvature of the cam disc 50 where space is left again by the linearly progressing gearing 5 of the rod 3. If the rod is currently not being driven by a specific gear tooth 40, i.e., the gear tooth 40 is currently not driven radially inward by the cam disc 50, the gearing 5 of the rod 3 drives the gear tooth 40 radially back outward until the inner radius of the cam disc 50 decreases again and thus drives the gear tooth 40 back inward. Between the driving outward and the driving inward of a gear tooth 40, the gear tooth 40 passes through a dead point. However, this is harmless in consideration of the plurality of gear teeth 40.

The drive of the transmission 1 is performed via the drive collar 20, which is connected in a rotationally fixed manner to the cam disc 50. The cam disc 50 and the drive collar 20 are mounted so they are rotatable together.

Figure 3:
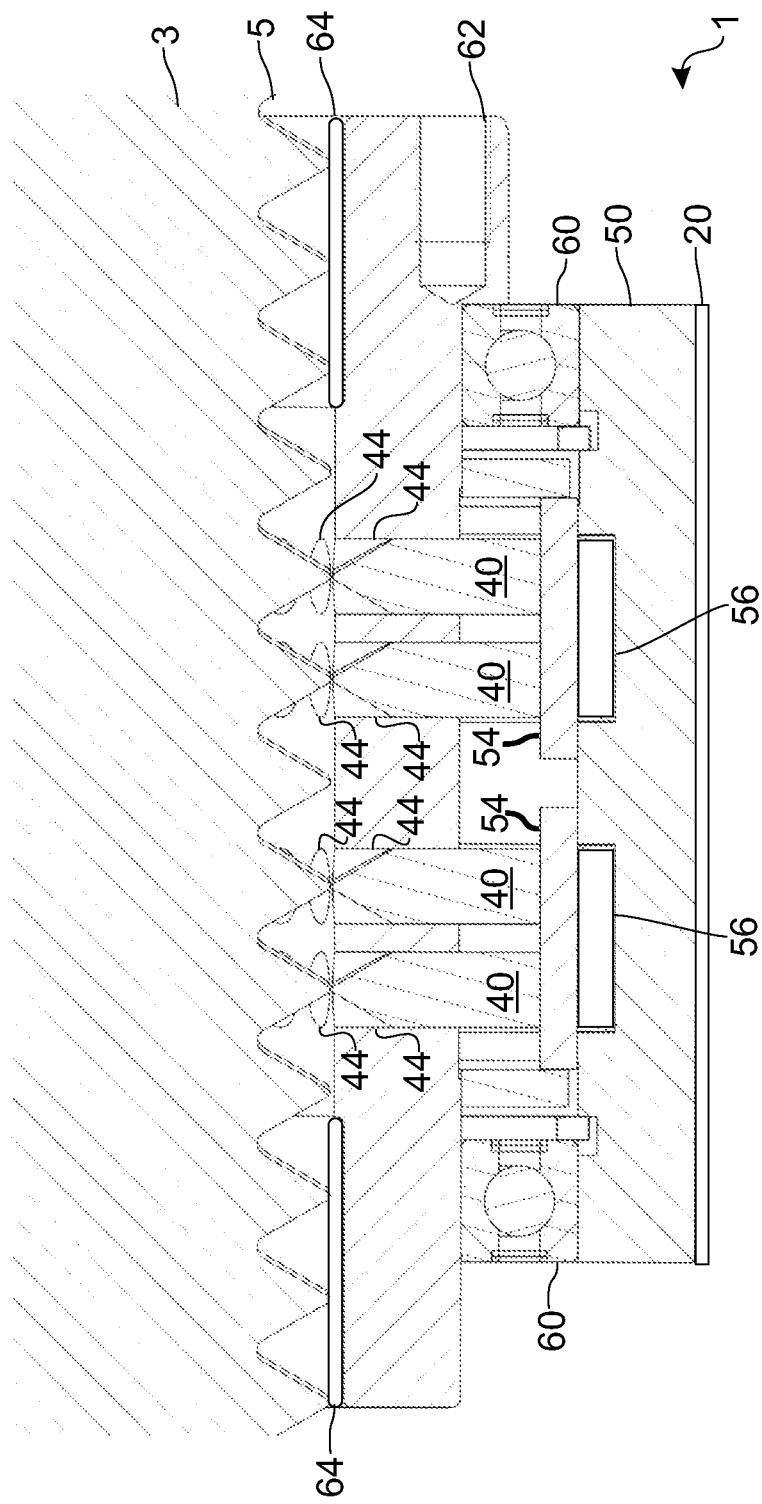
FIG. 3 shows a detail of a section through an embodiment which is similar to the embodiments of FIGS. 1 and 2.

FIG. 3 shows a partial sectional view along the longitudinal axis of a transmission, the embodiment of FIG. 3 corresponding in many features to the embodiment of FIGS. 1 and 2. Identical reference numerals are again used for identical or similar parts and these parts are not all described once again in detail.

Four circular revolving rows of openings 44 are disposed in the gear tooth carrier 10, in which gear teeth 40 are accommodated in four gear tooth circles. The gear teeth 40 engage in the gearing 5 of the rod 3. The gearing 5 of the rod 3, and the gear teeth 40 are disposed slightly inclined in relation to the sectional plane, so that parts of the flanks of the gear teeth 40 and the gearing 5 are also recognizable. In the section shown in FIG. 3, the gear teeth 40 shown are completely extended in the position shown of the transmission 1, so that the gear tooth heads of the gear teeth 40 are disposed on the heads of the gearing 5. The gear teeth 40 shown are located at a dead point. Other gear teeth which are disposed at other points of the circumference of the gear tooth carrier 10 are not completely extended, but rather are in other positions, for example, also completely retracted to the gear tooth base of the gearing 5 (lower dead point) or engaged with one flank.

The radial movement of the gear teeth 40 occurs for driving the gear teeth 40 inward by the drive having a cam disc 50. The cam disc 50 has an internal radius which is variable over the circumference as explained above in connection with FIG. 2. The gear teeth 40 are each assembled into packets of two, each two adjacent gear teeth 40 in the longitudinal direction 30 being accommodated in a support element 54. The support elements 54 are mounted using needle rolls 56 in the cam disc 50. The one cam disc 50 drives two revolving rows of support elements 54, in which two rows of gear teeth 40 are in turn disposed. The mounting of two gear teeth 40 in one support element 54 offers the advantage that, on the one hand, the support elements are secured against rotation, and that the gear teeth 40 are fixed in a defined location in relation to a rotation around a radial direction of the transmission 1. For this purpose, the support elements 54 typically have recesses, in which the correspondingly shaped feet of the gear teeth 40 (FIG. 4, flattening 74) engage.

The cam disc 50 is mounted together with the drive collar 20 using ball bearings 60 on the gear tooth carrier 10. The gear tooth carrier 10 is provided with a pocket hole 62 for a location-fixed fixation by means of screws. The gear tooth carrier 10 is fixed in location, while in contrast the rod 3 is only blocked against a rotation and is mounted so it is displaceable in the axial direction using two bearing bushes 64. However, a mounting of the rod 3 is already provided by the multiple gear tooth circles of the gear teeth 40 successively in the axial direction. During a driving of the transmission 1 at the drive collar 20 and a corresponding rotation of the cam disc 50, the gear teeth 40 are driven radially inward by the cam disc 50 or driven radially outward by the gearing 5, depending on the location of the cam disc 50 and the location of the observed gear tooth 40, a linear movement of the rod 3 in relation to the gear tooth carrier 10 occurring as a result.

In typical embodiments, the rod is mounted so it is displaceable in the axial direction using a plain bearing bush, also referred to as a bearing bush. The bearing bush preferably slides exclusively on the gear tooth heads or gear tooth tips of the gearing of the rod. This allows a simple construction. In further exemplary embodiments, the rod is mounted on at least one end. This requires a longer rod to provide sufficient space for the mounting, but can ensure a higher degree of stability.

Figure 4:
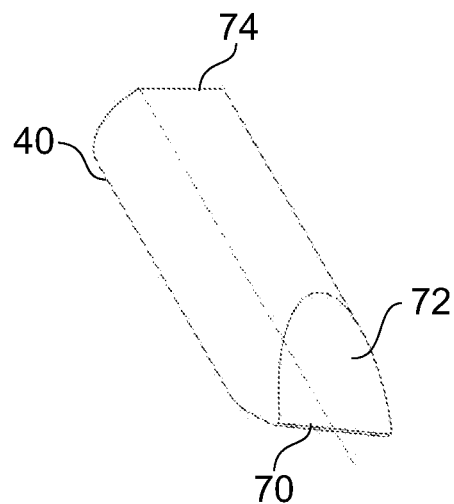
FIG. 4 shows a gear tooth of the embodiments of FIGS. 1 to 3.

FIG. 4 shows a single gear tooth 40 in a schematic, perspective view. The gear tooth 40 comprises a gear tooth head 70, which is adjoined by two gear tooth flanks 72, each designed as concave. The concave gear tooth flanks 72 allow optimum engagement of the gear teeth 40 in the gearing 5 of the rod 3 of FIGS. 1 to 3. During a radial movement of the gear teeth 40, the gearing 5 of the rods 3 of FIGS. 1 to 3 appears convex, so that for perfect operation, the gear teeth 40 are preferably equipped with concave gear tooth flanks 72. In the case of installation of the gear teeth 40 in the embodiments of FIGS. 1 to 3, the gear tooth heads 70 are slightly tilted in relation to the peripheral direction of the transmission 1, preferably less than 10° or preferably less than 5°. The tilting of the gear tooth heads 70 in relation to the peripheral direction is based on the pitch of the gearing 5 of the rod 3. At the end of the gear tooth 40 opposite to the gear tooth head 70, it has a flattening 74, which allows a pivot-locked accommodation of the gear tooth 40 in the support element 54 (FIG. 3).

Figure 5:
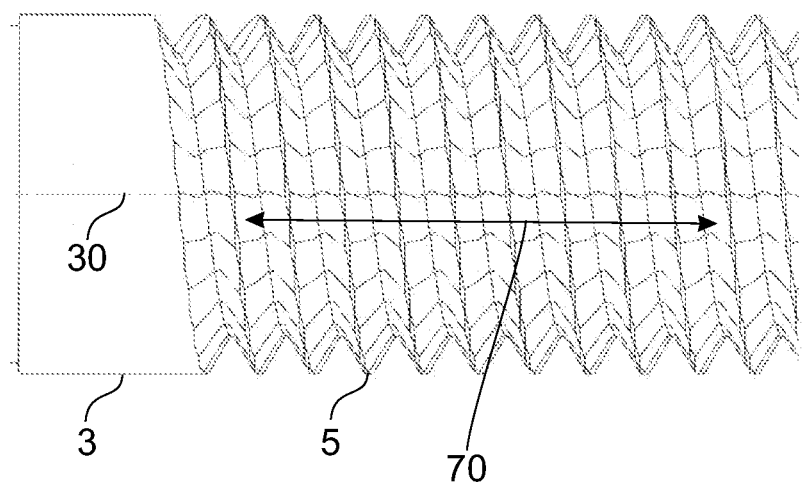
FIG. 5 shows further embodiments in a schematic side view of a further rod.

FIG. 5 shows a further possibility for taking into consideration the special geometric aspects of transmissions according to this application. The gearing 5 of the rod 3 of the embodiment of FIG. 5 is implemented as faceted. Through the faceted embodiment of the gearing 5, it is possible to use gear teeth which have linear gear tooth flanks, and do not have a negative crowning like the gear tooth of FIG. 4. The negative crowning corresponds to a convex gear tooth flank.

With the faceted gearing 5, individual gear tooth rows in the longitudinal direction of the rod 3 result along the rod 3. For example, one gear tooth row is identified by a double arrow 80. Along the gear tooth row of the double arrow 80, in an embodiment similar to the embodiment of FIG. 3, precisely four gear teeth move, which are accommodated in the longitudinal direction one behind another in the gear tooth carrier 10 (FIG. 3). Gear teeth which are accommodated in the gear tooth carrier 10 adjacent to these gear teeth in the circumferential direction move along an adjacent gear tooth row of the rod 3.

Because of the fact that gear teeth which are accommodated in the gear tooth carrier always move along a specific longitudinal direction on the rod 3, or, respectively, the rod 3 is moved accordingly, individual gear tooth rows which are separate from one another can also be provided on the rod 3. Further embodiments have multipart rods 3, individual parts of the rod 3 each being able to have one or more gear tooth rows.

The embodiments claimed in connection with FIGS. 1 to 3 and 5 have a rod 3 located in the middle, with gear teeth being driven radially inward by an external cam disc with an internal cam profile. Further embodiments have an internal cam disc, which drives gear teeth radially outward. The rod is implemented as hollow having internal gearing in such embodiments.

Figure 6:
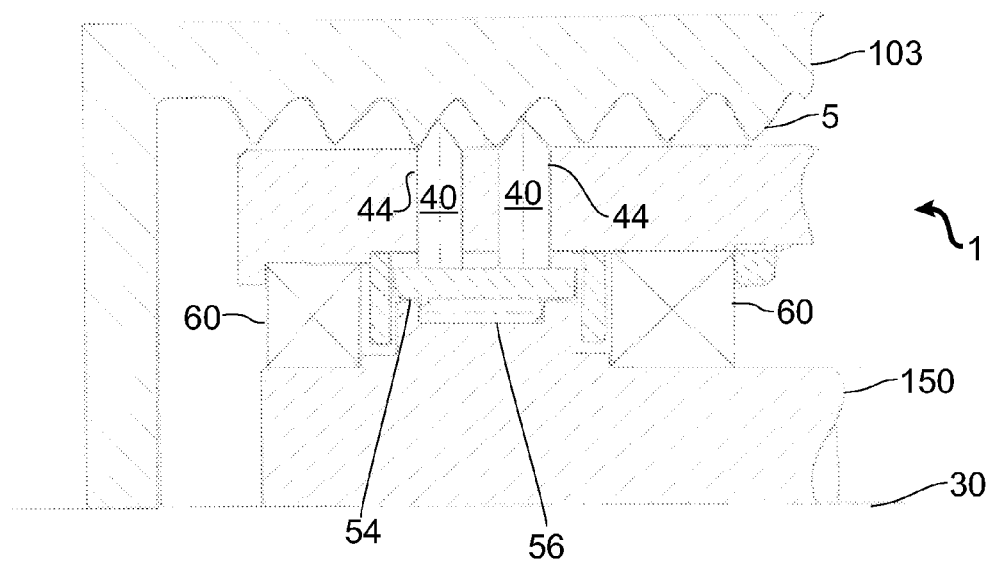
FIG. 6 schematically shows a further embodiment in a sectional partial view.

FIG. 6 shows a sectional view of a detail or a half of an embodiment. Only one half is shown in relation to the longitudinal axis 30 of the transmission 1 of FIG. 6 in the sectional view of FIG. 6.

The transmission 1 of FIG. 6 is capable of converting a rotational movement into a linear movement. The transmission 1 of FIG. 6 comprises an internal cam disc 150, which is formed integrally with a shaft. The cam disc 150 is mounted so it is rotatable by means of ball bearings 60. A gear tooth carrier 10 is mounted in a fixed manner, so that it is neither rotatable nor displaceable. The cam disc 150 is mounted so it is rotatable using the ball bearings 60 in relation to the gear tooth carrier 10.

The cam disc 150 is used for the purpose of driving gear teeth 40 radially outward. When the gear teeth 40 are driven radially outward in relation to the longitudinal axis 30, they engage in a gearing 5, which is designed as an internal gearing, of a rod 103, which is designed as hollow in the exemplary embodiment of FIG. 6. During operation of the transmission 1 of FIG. 6, the hollow rod 103 having the internal gearing 5 is displaced linearly in relation to the fixed gear tooth carrier 10, i.e., to the right or to the left in the sectional view of FIG. 6. An operation in the opposite direction is also possible, i.e., in the case of a drive in the form of a linear displacement of the rod 103, the cam disc 150 having the integrally formed shaft is rotated. The gear teeth 40 of the exemplary embodiment of FIG. 6 are implemented as convex and the flanks of the gearing of the hollow rod 102 are implemented as concave.

One advantage of the embodiment of FIG. 6 is that flanging a motor onto the cam disc 150 is simple. A compact transmission can be provided in this way. The gear teeth 40 are again accommodated in support elements 54, two gear teeth 40 being accommodated in each support element 54. The support elements 54 are mounted using needle rollers 56 on the cam disc 150. Otherwise, the embodiment of FIG. 6 is similar to the embodiments of FIGS. 1 to 13.

Further embodiments can comprise more than two gear teeth per support element in a row in the longitudinal direction. It is also possible to implement embodiments which do not comprise gear teeth mounted in pairs, but rather individually mounted gear teeth. The support elements are implemented individually for two gear teeth each in typical embodiments. Further embodiments comprise a revolving support element, which is sufficiently flexible so that it can adapt to the rotating cam disc. Such alternative bearing possibilities are possible both for internal cam discs and also for external cam discs (cam discs with an internal cam profile). In typical embodiments, the support element is mounted on needle rollers. Further embodiments comprise sliding friction for mounting the support elements. Further embodiments have a direct plain mounting of the gear teeth.

The invention claimed is:

1. A transmission for converting a rotational movement around a longitudinal axis of the transmission into a linear movement in the direction of the longitudinal axis or vice versa, having
   a rod having a gearing,
   a gear tooth carrier, in which gear teeth for an engagement with the gearing are accommodated so they are radially movable,
   wherein the rod and the gear tooth carrier are mounted so they are rotationally fixed relative to one another and linearly displaceable relative to one another in the direction of the longitudinal axis, and having
   a cam disc mounted rotatably around the longitudinal axis of the transmission for radially driving the gear teeth,
   wherein the rod is disposed inside the gear tooth carrier, and
   wherein the cam disc is designed as a cam disc with an internal cam profile.

2. The transmission according to claim 1, characterized by a drive device for radially driving the gear teeth.

3. The transmission according to claim 1, characterized in that the cam disc drives the gear teeth and the gearing is implemented in such a manner that during a rotation of the cam disc, the rod is linearly displaced in relation to the gear tooth carrier.

4. The transmission according to claim 1, characterized in that a pitch is provided between the gearing of the rod and the gear teeth disposed in the gear tooth carrier.

5. The transmission according to claim 1, characterized in that the gear teeth are disposed pivoted around a radial direction in relation to the longitudinal axis.

6. The transmission according to claim 1, characterized in that the gearing of the rod is designed as faceted.

7. A drive having a transmission according to claim 1 having a motor which drives the cam disc.

8. A use of a linear transmission according to claim 1 for converting a rotational movement into a linear movement.

9. The use according to claim 8, characterized in that the gear tooth carrier and the rod each form a linear output element or a counter bearing.

\* \* \* \* \*